(12) United States Patent
Byun et al.

(10) Patent No.: US 9,490,470 B2
(45) Date of Patent: Nov. 8, 2016

(54) SECONDARY BATTERY

(71) Applicant: SAMSUNG SDI CO., LTD., Yongin-si, Gyeonggi-do (KR)

(72) Inventors: Sangwon Byun, Yongin-si (KR); Haekwon Yoon, Yongin-si (KR); Seungbok Lee, Yongin-si (KR); Minyeol Han, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 684 days.

(21) Appl. No.: 13/933,780

(22) Filed: Jul. 2, 2013

(65) Prior Publication Data

US 2014/0234673 A1    Aug. 21, 2014

(30) Foreign Application Priority Data

Feb. 20, 2013  (KR) .................. 10-2013-0018063

(51) Int. Cl.
*H01M 2/34* (2006.01)
*H01M 2/26* (2006.01)

(52) U.S. Cl.
CPC .............. *H01M 2/348* (2013.01); *H01M 2/266* (2013.01); *H01M 2200/103* (2013.01)

(58) Field of Classification Search
None
See application file for complete search history.

(56) References Cited

U.S. PATENT DOCUMENTS

| | | | | |
|---|---|---|---|---|
| 4,879,187 A | * | 11/1989 | Biegger | ................ H01M 2/34 429/161 |
| 8,758,929 B2 | * | 6/2014 | Byun | ................ H01M 2/266 429/161 |

| | | | |
|---|---|---|---|
| 2006/0019158 A1 | 1/2006 | Mori et al. | |
| 2010/0279156 A1 | 11/2010 | Kim et al. | |
| 2011/0039136 A1 | 2/2011 | Byun et al. | |
| 2011/0052949 A1 | 3/2011 | Byun et al. | |
| 2011/0177387 A1 | 7/2011 | Byun et al. | |
| 2011/0183165 A1 | 7/2011 | Byun et al. | |
| 2011/0244281 A1 | 10/2011 | Byun | |
| 2011/0300419 A1 | * 12/2011 | Byun | ...................... H01M 2/22 429/61 |
| 2012/0263976 A1 | * 10/2012 | Byun | ................... H01M 2/266 429/7 |

FOREIGN PATENT DOCUMENTS

| | | |
|---|---|---|
| EP | 0 313 405 A1 | 5/1989 |
| EP | 2 348 558 A1 | 7/2011 |
| EP | 2 357 685 A1 | 8/2011 |
| JP | 5-325943 A | 12/1993 |
| JP | 8-185850 A | 7/1996 |
| JP | 2001-148239 A | 5/2001 |
| JP | 2005-142026 A | 6/2005 |

(Continued)

OTHER PUBLICATIONS

Korean Office Action dated Apr. 6, 2016 in Corresponding Korean Patent Application No. 10-2013-0018063.

(Continued)

*Primary Examiner* — Gregg Cantelmo
(74) *Attorney, Agent, or Firm* — Lee & Morse, P.C.

(57) ABSTRACT

The secondary battery includes an electrode assembly including a first electrode plate, a second electrode plate and a separator interposed between the first electrode plate and the second electrode plate, a case accommodating the electrode assembly, and a first current collector plate electrically connected to the first electrode plate and having a first fuse part formed at its one side, wherein the first fuse part includes at least two fuse holes spaced apart from each other.

14 Claims, 8 Drawing Sheets

(56) References Cited

FOREIGN PATENT DOCUMENTS

| | | |
|---|---|---|
| JP | 2007-266000 A | 10/2007 |
| KR | 10-2011-0005197 A | 1/2011 |
| KR | 10-2011-0017820 A | 2/2011 |
| KR | 10-2011-0025056 A | 3/2011 |
| KR | 10-1036070 B1 | 5/2011 |
| KR | 10-2011-0084079 A | 7/2011 |
| KR | 10-2012-0002406 A | 1/2012 |
| KR | 10-2012-0118315 A | 10/2012 |

OTHER PUBLICATIONS

English Machine Translation of JP 8-185850 A dated Jul. 16, 1996, 110 pages.
Korean Intellectual Property Office (KIPO) Notice of Allowance for KR 10-2011-0035808 dated Mar. 25, 2013, 1 page (translation).
English Machine Translation of JP 5-325943 A dated Dec. 10, 1993, 10 pages.
Extended European Search Report dated Jul. 17, 2012 for EP 11184423.9, 9 pages.

* cited by examiner

SECONDARY BATTERY

CROSS-REFERENCE TO RELATED APPLICATION

The present application claims the benefit of Korean Patent Application No. 10-2013-0018063, filed on Feb. 20, 2013, in the Korean Intellectual Property Office, and entitled: "Secondary Battery," which is incorporated by reference herein in its entirety.

BACKGROUND

1. Field

Embodiments relate to a secondary battery.

2. Description of the Related Art

Secondary batteries are rechargeable, unlike primary batteries which are not. Types of secondary batteries include a low capacity battery including a battery cell in the form of a pack and typically used for small portable electronic devices, e.g., cellular phones and camcorders, and a high capacity battery including dozens of battery cells connected to one another and widely used as a motor-driving power source for electric scooters, hybrid vehicles, or electric vehicles.

Secondary batteries may be manufactured in various shapes, including cylindrical and prismatic shapes. Each of the unit batteries typically includes an electrode assembly having a positive electrode, a negative electrode, and a separator between the positive and negative electrodes, a case for housing the electrode assembly together with an electrolyte, and a cap assembly installed to seal the case and having electrode terminals.

If excessive heat is generated or the internal pressure of the secondary battery increases due to a variety of factors, e.g., decomposition of an electrolyte, ignition or explosion of the secondary battery may result. Accordingly, there is a need for a secondary battery having improved safety.

SUMMARY

One or more embodiments are directed to providing a secondary battery including an electrode assembly including a first electrode plate, a second electrode plate and a separator interposed between the first electrode plate and the second electrode plate, a case accommodating the electrode assembly, and a first current collector plate electrically connected to the first electrode plate and having a first fuse part formed at its one side, wherein the first fuse part includes at least two fuse holes spaced apart from each other.

The first current collector plate may include a first connection part connected to the first electrode plate and formed at one side of the electrode assembly, and a first extension part bent from the first connection part and upwardly extending from the electrode assembly, wherein a corner is formed at a portion where the first connection part and the first extension part meet.

The first fuse part may be formed at the first extension part.

In addition, the first fuse part may include a first fuse hole formed at a portion adjacent to the corner, and a second fuse hole spaced apart from the first fuse hole horizontally away from the corner.

The first fuse hole and the second fuse hole may have the same size.

In addition, the first fuse hole and the second fuse hole may have a width in a range of 0.5 to 2.0 mm.

A distance between the first fuse hole and the second fuse hole may be 2 to 4 times of the width of the first fuse hole or the second fuse hole.

A first terminal hole may be formed at the other side of the first current collector plate to be engaged with a first electrode terminal, and the second fuse hole may be formed between the first fuse hole and the first terminal hole.

The first fuse part may include first and third fuse holes formed at portions adjacent to the corner, and second and fourth fuse holes formed to be spaced apart from the first and third fuse holes horizontally away from the corner.

The first and third fuse holes may be equally spaced apart from the corner, and the second and fourth fuse holes may be equally spaced apart from the first and third fuse holes.

A first terminal hole may be formed at the other side of the first current collector plate to be engaged with a first electrode terminal, and the second and fourth fuse holes may be formed between each of the first and third fuse holes and the first terminal hole.

The first fuse part may be formed at the first connection part.

In addition, the first fuse part may include a first fuse hole formed at a portion adjacent to the corner, and a second fuse hole spaced apart from the first fuse hole vertically away from the corner.

The first fuse hole and the second fuse hole may have the same size.

In addition, the first fuse hole and the second fuse hole may have a width in a range of 0.5 to 2.0 mm.

A distance between the first fuse hole and the second fuse hole may be 2 to 4 times of the width of the first fuse hole or the second fuse hole.

The first fuse part may include first and third fuse holes formed at portions adjacent to the corner, and second and fourth fuse holes spaced apart from the first and third fuse holes vertically away from the corner.

The first and third fuse holes may be equally spaced apart from the corner, and the second and fourth fuse holes may be equally spaced apart from the first and third fuse holes.

BRIEF DESCRIPTION OF THE DRAWINGS

Features will become apparent to those of ordinary skill in the art by describing in detail exemplary embodiments with reference to the attached drawings in which.

DETAILED DESCRIPTION

Hereinafter, examples of embodiments will be described in detail with reference to the accompanying drawings such that they can easily be made and used by those skilled in the art.

Figure 1:
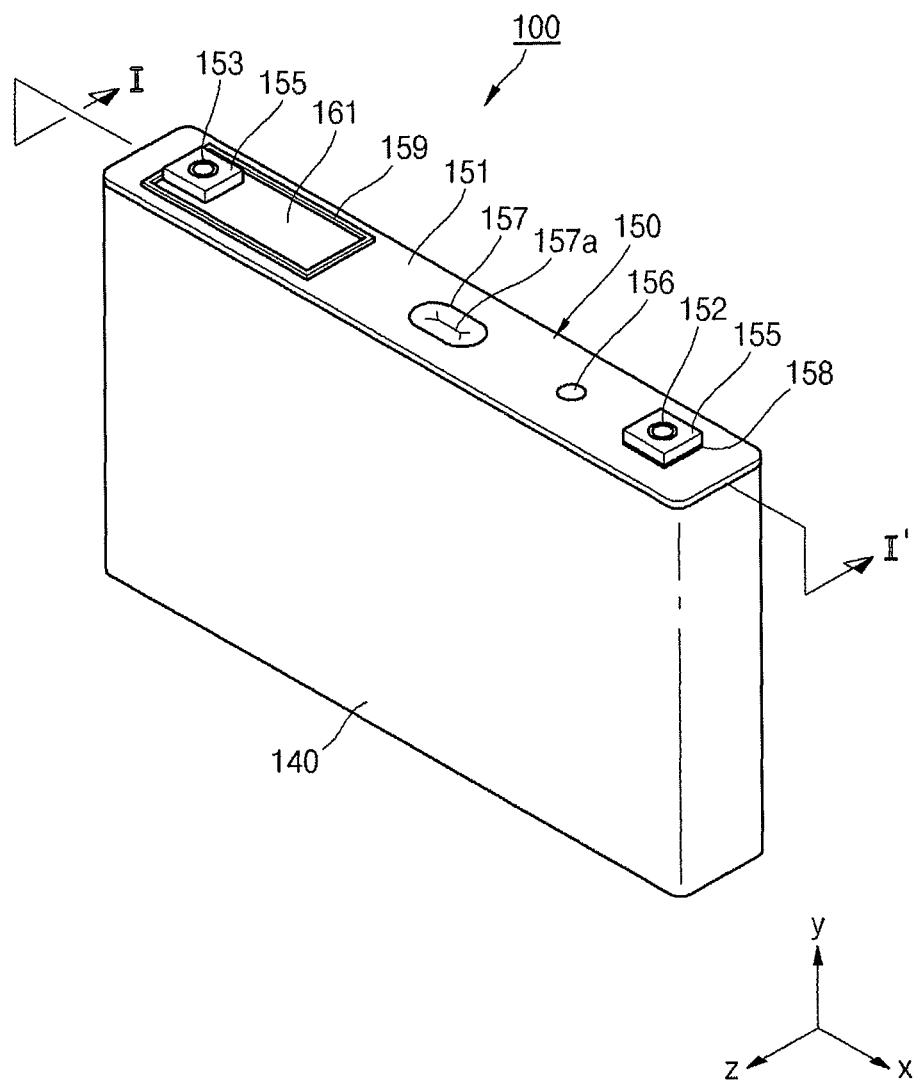
FIG. 1 illustrates a perspective view of a secondary battery according to an embodiment.
Figure 2:
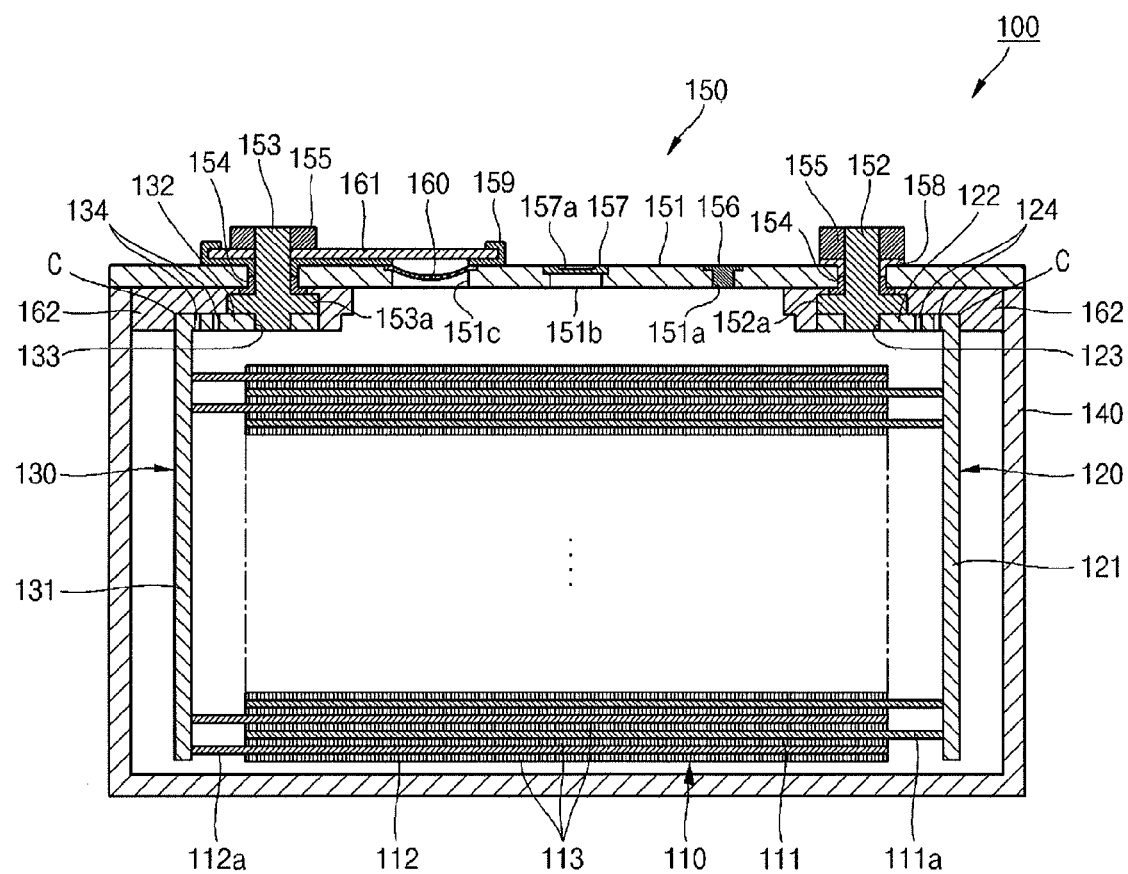
FIG. 2 illustrates a cross-sectional view of the secondary battery taken along the line I-I' of FIG. 1.
Figure 3A:
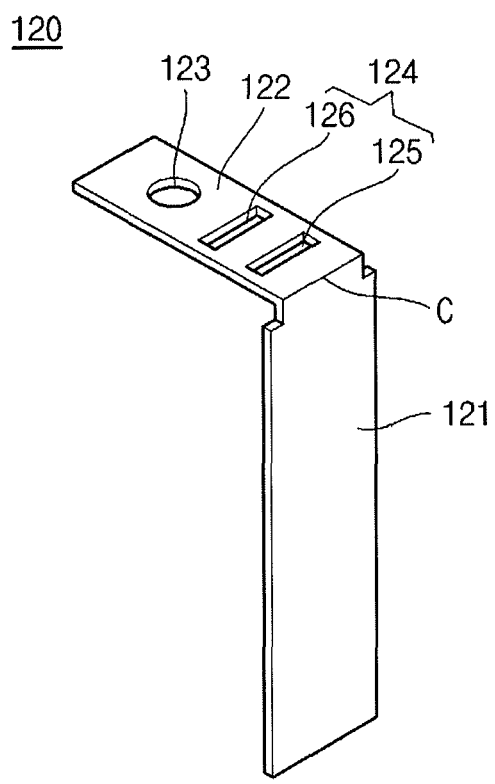
FIG. 3A illustrates a perspective view of a first current collector plate shown in FIG. 2.
Figure 3B:
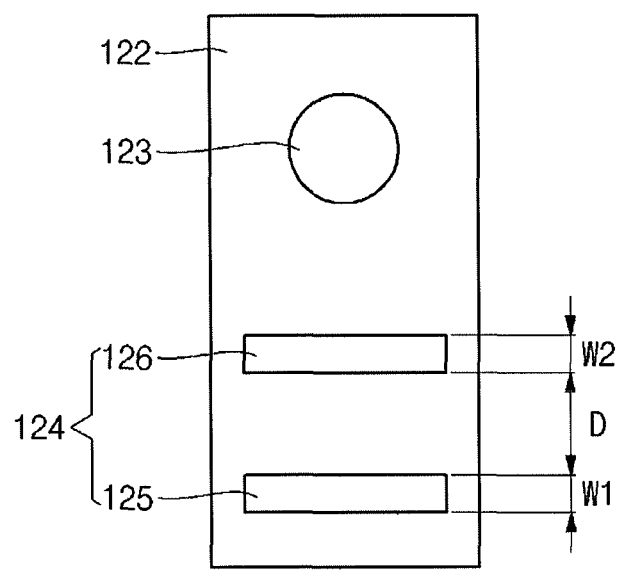
FIG. 3B illustrates a plan view of a first extension part shown in FIG. 3A.

FIG. 1 illustrates a perspective view of a secondary battery according to an embodiment. FIG. 2 illustrates a cross-sectional view of the secondary battery taken along the line I-I' of FIG. 1. FIG. 3A illustrates a perspective view of a first current collector plate shown in FIG. 2. FIG. 3B illustrates a plan view of a first extension part shown in FIG. 3A.

Referring to FIGS. 1 and 2, secondary battery 100 according to the embodiment includes an electrode assembly 110, a first current collector plate 120, a second current collector plate 130, a case 140, and a cap assembly 150.

The electrode assembly 110 may be formed by winding or laminating a stacked structure including a first electrode plate 111, a separator 113, and a second electrode plate 112. Here, the first electrode plate 111 may be a positive electrode plate and the second electrode plate 112 may be a negative electrode plate.

The first electrode plate 111 may be formed by applying a first electrode active material, e.g., a transition metal, on a first electrode collector plate formed of a metal foil, e.g., aluminum foil. The first electrode plate 111 may include a first electrode uncoated portion 111a on which the first electrode active metal is not applied. The first electrode uncoated portion 111a may function as a passage for current flowing between the first electrode plate 111 and the outside of the first electrode plate 111.

The second electrode plate 112 may be formed by applying a second electrode active material, e.g., graphite or carbon, on a second electrode collector plate formed of a metal foil, e.g., nickel or copper foil. The second electrode plate 112 may include a second electrode uncoated portion 112a on which the second electrode active metal is not applied. The second electrode uncoated portion 112a may function as a passage for current flowing between the second electrode plate 112 and the outside of the second electrode plate 112.

In other implementations, the relative polarities of the first and second electrode plates 111 and 112 may differ from what is described above.

The separator 113 may be disposed between the first electrode plate 111 and the second electrode plate 112 to prevent short circuiting and allow the movement of lithium ions. The separator 113 may be formed of, e.g., polyethylene, polypropylene, or combined film of polypropylene and polyethylene.

The electrode assembly 110 and electrolyte are accommodated within the case 140. The electrolyte may include an organic solvent, e.g., ethylene carbonate (EC), propylene carbonate (PC), diethyl carbonate (DEC), ethyl methyl carbonate (EMC), or dimethyl carbonate (DMC), a lithium salt, e.g., $LiPF_6$ or $LiBF_4$. The electrolyte may be a liquid, a solid, or a gel.

The first current collector plate 120 is made of a conductive material, e.g., aluminum, and makes contact with the first electrode uncoated portion 111a protruding to a first end of the electrode assembly 110, so that it is electrically connected to the first electrode plate 111. Referring to FIGS. 3A and 3B, the first current collector plate 120 may include a first connection part 121, a first extension part 122, a first terminal hole 123, and a first fuse part 124.

The first connection part 121 is formed at a first side of the electrode assembly 110 and is shaped of a plate substantially contacting the first electrode uncoated portion 111a. The first connection part 121 may be welded to the first electrode uncoated portion 111a. As can be seen in FIGS. 2 and 3A, the first connection part extends along the y-axis between the electrode assembly 110 and the case 140.

The first extension part 122 is bent and extends at an end of the first connection part 121. As evident from FIGS. 2 and 3A, the first extension part 122 extends along the x-axis from an upper end, i.e., closest to the cap assembly 150, of the first connection part 121. The first extension part 122 is between an upper portion of the electrode assembly 110 and a lower portion of the cap assembly 150, and is plate shaped. Where the first connection part 121 and the first extension part 122, i.e., a first end of the first connection part 121 and a first end of the first extension part 122, meet is referred to as a corner C. The first connection part 121 and the first extension part 122 may be perpendicular to each at the corner C.

The first terminal hole 123 is formed at one side of the first extension part 122 and is positioned far from the corner C, i.e., closer to a second end of the first extension part 122 opposite the first end. The first terminal hole 123 provides a space into which a first electrode terminal 152 of the cap assembly 150 is fitted and coupled.

The first fuse part 124 is formed at the upper portion of the electrode assembly 110, i.e., the first extension part 122, so as not to make contact with an electrolyte, since the electrolyte may ignite due to heat generated from the first fuse part 124. In addition, the first fuse part 124 is positioned at a region of the first extension part 122 adjacent to the corner C so as not to overlap the first electrode terminal 152 coupled to the first terminal hole 123.

The first fuse part 124 may include a first fuse hole 125 and a second fuse hole 126. The first fuse hole 125 is formed at a portion adjacent to the corner C and the second fuse hole 126 is spaced apart from the first fuse hole 125. Here, the second fuse hole 126 is formed to be spaced apart from the first fuse hole 125 horizontally away from the corner C, i.e., the second fuse hole 126 is positioned between the first fuse hole 125 and the first terminal hole 123.

In detail, the first fuse hole 125 passes through the first extension part 122. As shown in FIGS. 3A and 3B, the first fuse hole 125 may be rectangular, e.g., a rectangle elongated in a direction parallel to the corner C, i.e., along the z-axis. In addition, a width W1, i.e., along the x-axis, of the first fuse hole 125 may be in a range of about 0.5 mm to about 2.0 mm. If the width W1 of the first fuse hole 125 is smaller than about 0.5 mm, the first fuse hole 125 may not properly function as a fuse. If the width W1 of the first fuse hole 125 is greater than about 2.0 mm, the first extension part 122 may have reduced mechanical strength, rendering it vulnerable to bending or damages due to external impacts.

The second fuse hole 126 and the first fuse hole 125 may have the same shape and size, i.e., the second fuse hole 126 may be an elongated rectangle having a width W2 equal to the width W1 of the first fuse hole 125 (W1=W2). A distance D, i.e., along the x-axis, between the first fuse hole 125 and the second fuse hole 126 may be approximately two to four times of the width W1 of the first fuse hole 125 or the width W2 of the second fuse hole 126. If the distance D is smaller than two times of the width W1 of the first fuse hole 125 or the width W2 of the second fuse hole 126, a distance between opposite ends of the first fuse part 124 is reduced, so that an arc is liable to occur. If the distance D is greater than four times of the width W1 of the first fuse hole 125 or the width W2 of the second fuse hole 126, the secondary battery 100 may become excessively bulky.

In general, a fuse part having a fuse hole is melted by heat generated when a large amount of current flows due to an electric short of a secondary battery, and cut, thereby functioning as a fuse that blocks the flow of current. The short-circuiting may be induced by allowing short-circuit plates to make contact with each other when the internal pressure of the secondary battery exceeds a preset pressure due to heat generated and decomposition of an electrolyte when the secondary battery is over-charged. Here, even if the fuse hole is melted and cut, additional short-circuiting may result from an arc occurring at the opposite ends of the fuse part. In particular, gas present between the opposite ends of the fuse part may be converted into an electrically conducting medium, allowing current to flow. As a result, the secondary battery may become a safety risk, e.g., may ignite or explode.

In contrast, according to the present embodiment, when a large amount of current flows due to short-circuiting of the secondary battery 100, the first fuse hole 125 and the second fuse hole 126 spaced apart from each other are simultaneously melted and cut, so an arc does not occur to the opposite ends of the fuse part 124. That is to say, if the first fuse hole 125 and the second fuse hole 126 are melted and cut, current does not flow between the first fuse hole 125 and the second fuse hole 126. In addition, since the opposite ends of the first fuse part 124 are spaced a distance between the first fuse hole 125 and the second fuse hole 126 apart from each other, the arc does not occur to the opposite ends of the fuse part 124. Here, the greater the distance between the first fuse hole 125 and the second fuse hole 126, the less likely the arc will occur.

As described above, the secondary battery 100 according to the embodiment includes the first fuse part 124 having the first fuse hole 125 and the second fuse hole 126, thereby suppressing occurrence of an arc by securing a sufficient distance between the opposite ends of the fuse part 124. Accordingly, the secondary battery 100 according to the embodiment may have improved safety by increasing the reliability of the fuse part functioning as a fuse.

The second current collector plate 130 is made out of a conductive material, e.g., nickel, and makes contact with the second electrode uncoated portion 112a that protrudes toward a second end of the electrode assembly 110 so that the second current collector plate 130 is electrically connected to the second electrode plate 112. The second current collector plate 130 includes a second connection part 131, a second extension part 132, a second terminal hole 133, and a second fuse part 134.

Since the second current collector plate 130 has the same configuration and shape as those of the first current collector plate 120 shown in FIG. 3A, a repeated description thereof will not be given here. When the first current collector plate 120 includes the first fuse part 124 functioning as a fuse, the second current collector plate 130 may not include the second fuse part 134. When a current collector plate having the fuse, e.g., the first current collector plate 120, is made of a material, e.g., aluminum, having a lower melting point than a material, e.g., nickel, of another current collector plate, e.g., the second current collector plate 130, the fuse function can be more easily achieved. Alternatively, the first fuse part 124 may not be included in the first current collector plate 120, but only the second fuse part 134 may be formed in the second current collector plate 130. In other words, the fuse parts 124 and 134 may be formed only on one of or on both of the first current collector plate 120 and the second current collector plate 130.

The case 140 may be made of aluminum, an aluminum alloy, or a conductive metal, e.g., nickel-plated steel, and may have a substantially hexahedral shape having an opening through which the electrode assembly 110, the first current collector plate 120, and the second current collector plate 130 are inserted and arranged. Although the opening is not illustrated in FIG. 2, as the case 140 and the cap assembly 150 are in an assembled state, the peripheral portion of the cap assembly 150 substantially corresponds to the opening in the case 140. The interior surface of the case 140 is insulated, so that the case 140 is electrically insulated from the electrode assembly 110, the first current collector plate 120, the second current collector plate 130, and the cap assembly 150. The case 140 may serve as an electrode having a polarity, example e.g., a positive polarity.

The cap assembly 150 is coupled to the case 140. In detail, the cap assembly 150 may include a cap plate 151, a first electrode terminal 152, a second electrode terminal 153, gaskets 154, and a terminal plate 155. The cap assembly 150 may also include a plug 156, a safety vent 157, a connecting plate 158, an upper insulation member 159, a first short-circuit plate 160, a second short-circuit plate 161, and a lower insulation member 162.

The cap plate 151 seals the opening of the case 140, and may be made out of the same material as the case 140. The cap plate 151 may be coupled to the case 140, e.g., by laser welding. The cap plate 151 may have the same polarity as the case 140.

The first electrode terminal 152 penetrates a first end of the cap plate 151 and is electrically connected to the first current collector plate 120. The first electrode terminal 152 may have a pillar shape, and may protrude and extend by a predetermined length above the cap plate 151, e.g., along the y-axis. A flange 152a is formed at a lower portion of the first electrode terminal 152, i.e., below the cap plate 151 to prevent the first electrode terminal 152 from being dislodged from the cap plate 151. A region of the first electrode terminal 152 below the flange 152a is fitted into the first terminal hole 123 of the first current collector plate 120. Here, the first electrode terminal 152 is electrically connected to the cap plate 151.

The second electrode terminal 153 penetrates a second end, spaced along the x-axis from the first end, of the cap plate 151 and is electrically connected to the second current collector plate 130. Since the second electrode terminal 153 has the same configuration and shape as the first electrode terminal 152, a repeated description thereof will not be given here. However, the second electrode terminal 153 is electrically insulated from the cap plate 151.

The gaskets 154 are made of an insulating material, and may seal regions between the first electrode terminal 152 and the cap plate 151, and between the second electrode terminal 153 and the cap plate 151. The gaskets 154 also may prevent external moisture from permeating into the secondary battery 100 and prevent the electrolyte accommodated within the secondary battery 100 from effusing to an outside.

The terminal plate 155 is coupled to the first electrode terminal 152 and the second electrode terminal 153. In addition, the terminal plate 155 may be fixed, e.g., welded, to the first electrode terminal 152 and the second electrode terminal 153, thereby fixing the first electrode terminal 152 and the second electrode terminal 153 to the cap plate 151.

Boundary regions between each of the first electrode terminal 152 and the second electrode terminal 153 upwardly protruding through the cap plate 151 and the terminal plate 155 may be welded to each other. For example, laser beams may be applied to the boundary regions between each of the first electrode terminal 152 and the second electrode terminal 153, and the terminal plate 155, so that the boundary regions are melted and cooled to then be welded to each other.

The plug 156 seals an electrolyte injection hole 151a of the cap plate 151. The safety vent 157 is installed in a vent hole 151b of the cap plate 151 and has a notch 157a formed to be opened at a preset pressure.

The connecting plate 158 is between the first electrode terminal 152 and the cap plate 151, and is configured such that the first electrode terminal 152 is fitted thereinto. In addition, the connecting plate 158 closely contacts the cap plate 151 and the gaskets 154 through the terminal plate 155. The connecting plate 158 electrically connects the first electrode terminal 152 to the cap plate 151.

The upper insulation member 159 is between the second electrode terminal 153 and the cap plate 151 and is configured such that the second electrode terminal 153 is fitted thereinto. In addition, the upper insulation member 159 closely contacts the cap plate 151 and the gaskets 154 through the terminal plate 155. The upper insulation member 159 electrically insulates the second electrode terminal 153 from the cap plate 151.

The first short-circuit plate 160 is between the upper insulation member 159 and the cap plate 151 in a short-circuit hole 151c of the cap plate 151. The first short-circuit plate 160 may be formed of an inversion plate including a downwardly convex round part and an edge part fixed to the cap plate 151. When the internal pressure of the secondary battery 100 exceeds the preset pressure due to over-charge, the first short-circuit plate 160 is inverted and protrudes upward convexly. The first short-circuit plate 160 may have the same polarity as the cap plate 151.

The second short-circuit plate 161 is configured such that the second electrode terminal 153 is fitted thereinto at the outside spaced apart from the cap plate 151, that is, above upper insulation member 159, and extends to cover the short-circuit hole 151c. The second short-circuit plate 161 is electrically connected to the second electrode terminal 153. The second short-circuit plate 161 makes contact with the first short-circuit plate 160 protruding upward convexly when the internal pressure of the secondary battery 100 exceeds the preset pressure due to over-charge, causing short-circuiting. If the short-circuiting is caused, a large amount of current flows through the secondary battery 100 and heat is generated from the secondary battery 100. The first fuse part 124 and/or the second fuse part 134 functions as a fuse, thereby improving the safety of the secondary battery 100.

The lower insulation member 162 is between the first current collector plate 120 and the cap plate 151, and between the second current collector plate 130 and the cap plate 151, thereby preventing unnecessary short-circuiting from occurring.

As described above, the secondary battery 100 according to the embodiment includes the first fuse part 124 and/or the second fuse part 134 having two fuse holes spaced apart from each other along the x-axis, thereby suppressing occurrence of an arc by securing a sufficient distance between the two fuse holes. In addition, the secondary battery according to the embodiment includes the first fuse part 124 and/or the second fuse part 134 having two fuse holes spaced apart from each other along the x-axis, thereby improving the safety of the secondary battery by increasing the reliability of the fuse part functioning as a fuse.

Figure 4A:
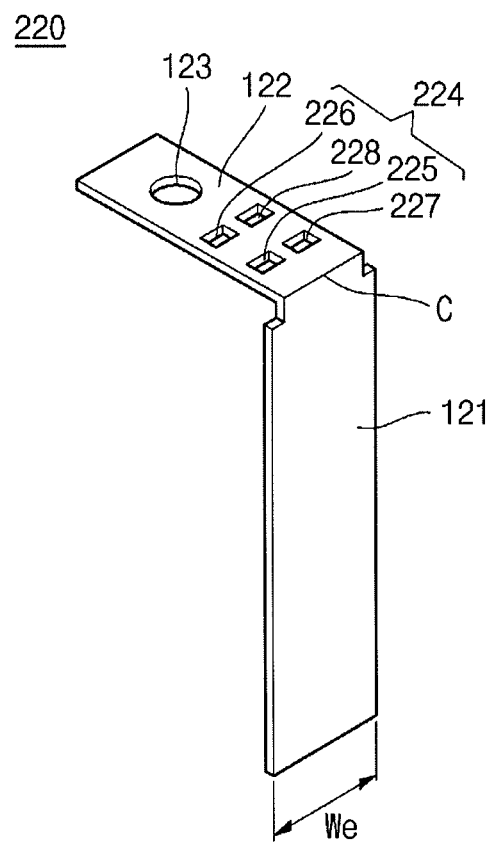
FIG. 4A illustrates a perspective view of a first current collector plate of a secondary battery according to another embodiment, corresponding to the first current collector plate shown in FIG. 3A.
Figure 4B:
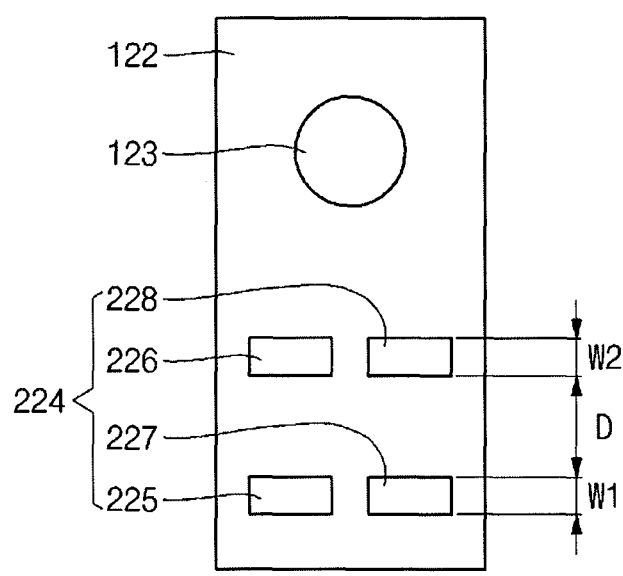
FIG. 4B illustrates a plan view of a first extension part shown in FIG. 4A.

A secondary battery according to another embodiment will now be described. FIG. 4A illustrates a perspective view of a first current collector plate of a secondary battery according to another embodiment, corresponding to the first current collector plate shown in FIG. 2. FIG. 4B is a plan view of a first extension part shown in FIG. 4A.

The secondary battery according to the present embodiment is substantially the same as the secondary battery 100 shown in FIG. 2, except for a configuration of a first fuse part 224 of a first current collector plate 220, and a repeated description thereof will not be given here. Accordingly, the following description will focus on the first fuse part 224 of the first current collector plate 220.

Referring to FIGS. 4A and 4B, the first current collector plate 220 may include the first connection part 121, the first extension part 122, the first terminal hole 123, and a first fuse part 224.

The first fuse part 224 is similar to the first fuse part 124 shown in FIGS. 3A and 3B, and performs the same function as the first fuse part 124. However, the first fuse part 224 includes a first fuse hole 225, a second fuse hole 226, a third fuse hole 227, and a fourth fuse hole 228. That is to say, the first fuse part 224 includes first and second fuse holes each divided into two holes, resulting in four fuse holes 225, 226, 227, and 228 in total, compared to the first fuse part 124 shown in FIGS. 3A and 3B, which includes the first fuse hole 125 and the second fuse hole 126.

The first fuse hole 225 and the third fuse hole 227 are formed adjacent to the corner C, and the second fuse hole 226 and the fourth fuse hole 228 are spaced apart from the first and third fuse holes 225 and 227, e.g., along the x-axis. Here, the second fuse hole 226 and the fourth fuse hole 228 are formed horizontally away from the corner C, i.e., along the x-axis. That is to say, the second fuse hole 226 and the fourth fuse hole 228 are positioned between each of the first fuse hole 225 and the third fuse hole 227, respectively, and the first terminal hole 123.

In addition, the first fuse hole 225 and the third fuse hole 227 are in a line to be parallel with each other in a widthwise direction of the first extension part 122, i.e., along the x-axis, and are formed to be spaced apart from each other along the z-axis. For example, the first fuse hole 225 and the third fuse hole 227 may be equally spaced apart from the corner C. In addition, the second fuse hole 226 and the fourth fuse hole 228 are positioned in a line to be parallel with each other in a widthwise direction of the first extension part 122 and are formed to be spaced apart from each other along the z-axis. For example, the second fuse hole 226 and the fourth fuse hole 228 may be equally spaced apart from the first fuse hole 225 and the third fuse hole 227.

As described above, the first fuse part 224 according to the embodiment of the includes the first fuse hole 225 and the third fuse hole 227 spaced apart from each other in the widthwise direction of the first extension part 122, and the second fuse hole 226 and the fourth fuse hole 228 spaced apart from the first fuse hole 225 and the third fuse hole 227 horizontally away from the corner C, i.e., along the x-axis, thereby reinforcing the mechanical strength of the first extension part 122 while suppressing occurrence of an arc by securing a sufficient distance between opposite ends of the first fuse part 224.

Figure 5:
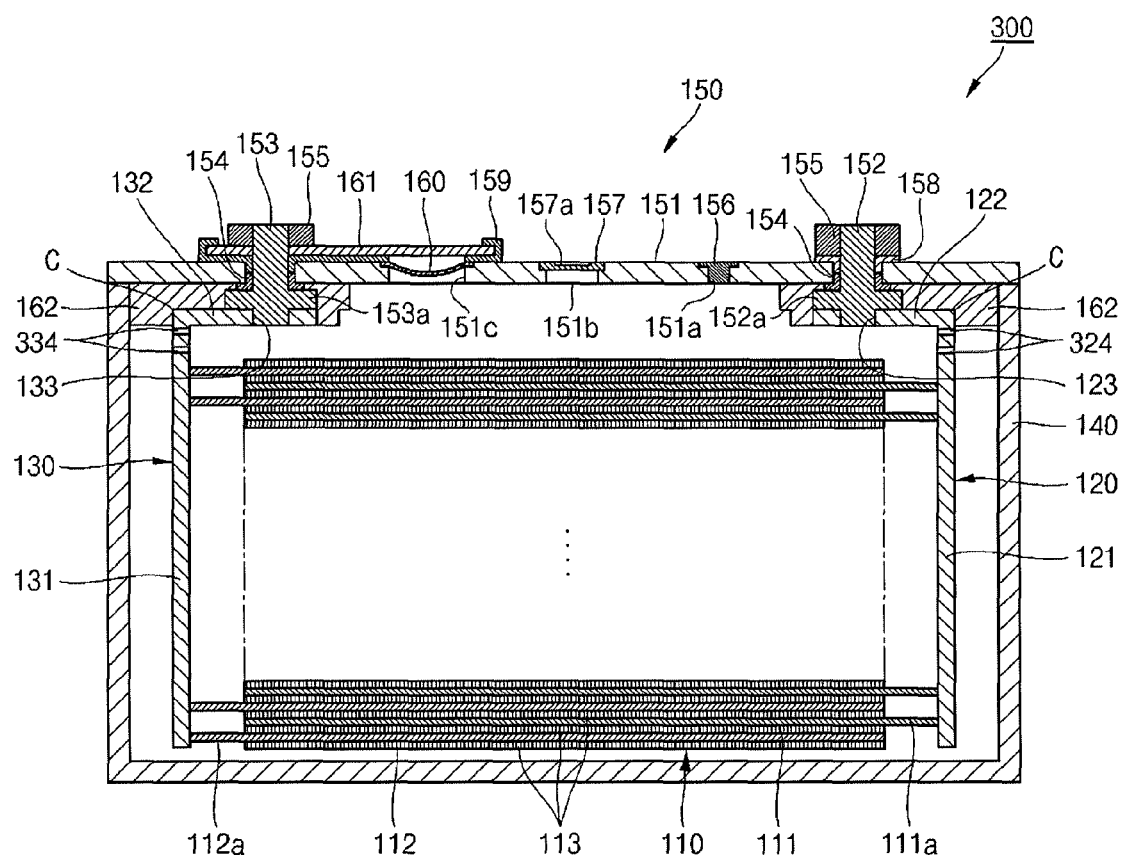
FIG. 5 illustrates a cross-sectional view of a secondary battery according to still another embodiment.
Figure 6A:
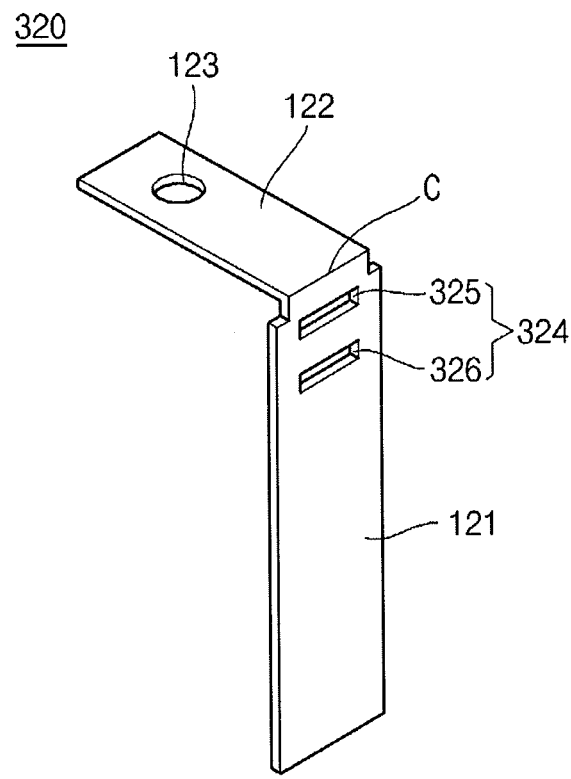
FIG. 6A illustrates a perspective view of a first current collector plate shown in FIG. 5.
Figure 6B:
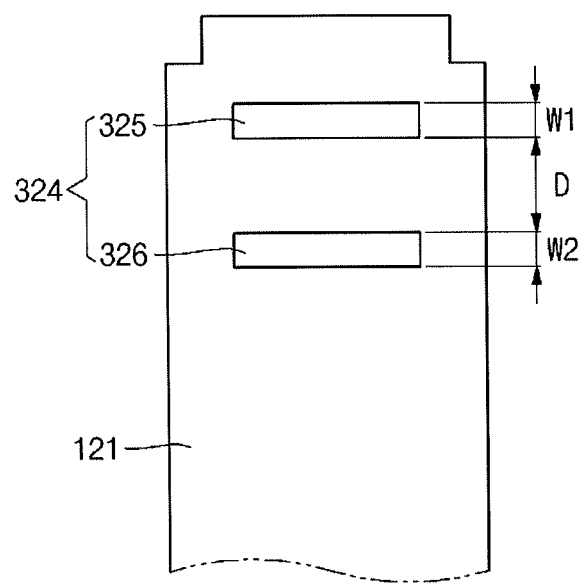
FIG. 6B illustrates a partial plan view of a first connection part shown in FIG. 6A.

A secondary battery according to still another embodiment will now be described. FIG. 5 illustrates a cross-sectional view of a secondary battery according to still another embodiment. FIG. 6A illustrates a perspective view of a first current collector plate shown in FIG. 5. FIG. 6B illustrates a partial plan view of a first connection part shown in FIG. 6A.

The secondary battery 300 according to the present embodiment is substantially the same as the secondary battery 100 shown in FIG. 2, except for locations of a first fuse part 324 of a first current collector plate 320 and a second fuse part 334 of a second current collector plate 330, and a repeated description thereof will not be given here. Accordingly, the following description will focus on the first fuse part 324 and the second fuse part 334.

Referring to FIG. 5, the secondary battery 300 according to the embodiment includes the electrode assembly 110, a first current collector plate 320, a second current collector plate 330, the case 140, and the cap assembly 150.

Referring to FIGS. 6A and 6B, the first current collector plate 320 may include the first connection part 121, the second extension part 122, the first terminal hole 123, and a first fuse part 324.

The first fuse part 324 is similar to the first fuse part 124 shown in FIGS. 3A and 3B, and performs the same function as the first fuse part 124. However, the first fuse part 324 is formed at an upper region of the first connection part 121, where a contact portion between the first connection part 121 and an electrolyte is minimized, i.e., a region adjacent to the corner C.

In addition, the first fuse part 324 includes a first fuse hole 325 and a second fuse hole 326. The first fuse hole 325 is adjacent to the corner C and the second fuse hole 326 is spaced apart from the first fuse hole 325. In particular, the second fuse hole 326 is spaced apart from the first fuse hole 325 vertically, i.e., along the y-axis, away from the corner C.

The second current collector plate 330 may include the second connection part 131, the second extension part 132, the second terminal hole 133, and a second fuse part 334. The second fuse part 334 is shaped like the first fuse part 324 and performs the same function as the first fuse part 324.

Figure 7A:
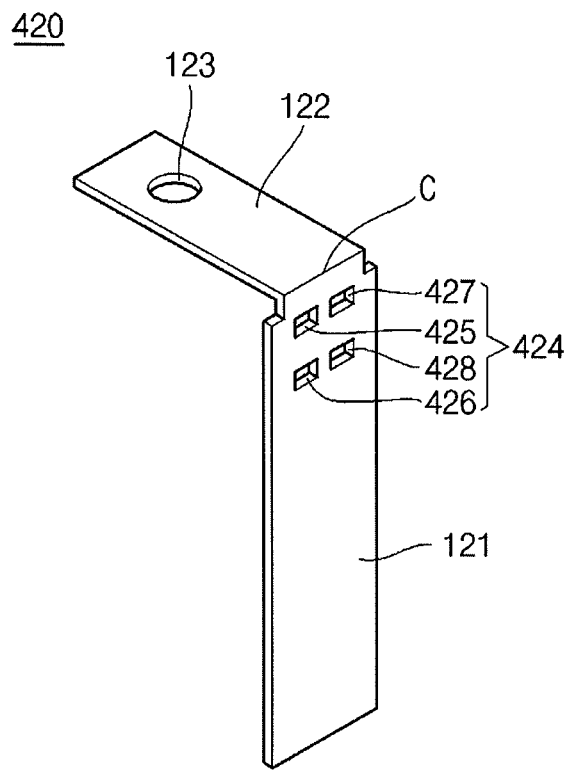
FIG. 7A illustrates a perspective view of a first current collector plate of a secondary battery according to still another embodiment, corresponding to the first current collector plate shown in FIG. 6A.
Figure 7B:
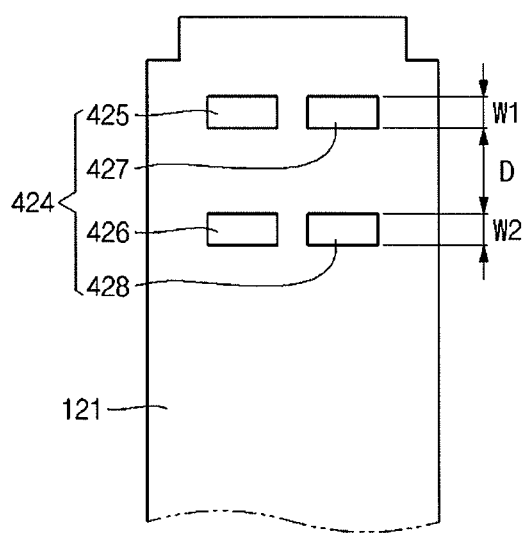
FIG. 7B illustrates a partial plan view of a first extension part shown in FIG. 7A.

A secondary battery according to still another embodiment will now be described. FIG. 7A illustrates a perspective view of a first current collector plate of a secondary battery according to still another embodiment corresponding to the first current collector plate shown in FIG. 5. FIG. 7B illustrates a partial plan view of a first extension part shown in FIG. 7A.

The secondary battery according to the embodiment is substantially the same as the secondary battery 300 shown in FIG. 5, except for configurations of a first fuse part 424 of a first current collector plate 420, and a repeated description thereof will not be given here. Accordingly, the following description will focus on the first fuse part 424 of the first current collector plate 420.

Referring to FIGS. 7A and 7B, the first current collector plate 420 may include the first connection part 121, the first extension part 122, the first terminal hole 123, and a first fuse part 424.

The first fuse part 424 is similar to the first fuse part 324 shown in FIGS. 6A and 6B, and performs the same function as the first fuse part 324. However, the first fuse part 424 includes a first fuse hole 425, a second fuse hole 426, a third fuse hole 427, and a fourth fuse hole 428. That is to say, the first fuse part 424 includes first and second fuse holes each divided into two holes, resulting in four fuse holes 425, 426, 427, and 428 in total, compared to the first fuse part 324 shown in FIGS. 6A and 6B, which includes the first fuse hole 325 and the second fuse hole 326.

The first fuse hole 425 and the third fuse hole 427 are formed at portions adjacent to the corner C, and the second fuse hole 426 and the fourth fuse hole 428 are formed to be spaced apart from the first and third fuse holes 425 and 427. Here, the second fuse hole 426 and the fourth fuse hole 428 are formed vertically, i.e., along the y-axis, away from the corner C.

In addition, the first fuse hole 425 and the third fuse hole 427 are in a line to be parallel with each other in a widthwise direction, i.e., along the z-axis, of the first connection part 121 and are formed to be spaced apart from each other, i.e., along the z-axis. That is to say, the first fuse hole 425 and the third fuse hole 427 are equally spaced apart from the corner C, i.e., along the y-axis. In addition, the second fuse hole 426 and the fourth fuse hole 428 are in a line to be parallel with each other in a widthwise direction of the first connection part 121 and are formed to be spaced apart from each other, i.e., along the z-axis. That is to say, the second fuse hole 426 and the fourth fuse hole 428 are equally spaced apart along the y-axis from the first fuse hole 425 and the third fuse hole 427.

As described above, the first fuse part 424 according to the present embodiment includes the first fuse hole 425 and the third fuse hole 427 spaced apart from each other in the widthwise direction, i.e., along the z-axis, of the first connection part 121, and the second fuse hole 426 and the fourth fuse hole 428 spaced apart from the first fuse hole 425 and the third fuse hole 427 vertically away, i.e., along the y-axis, from the corner C, thereby reinforcing the mechanical strength of the first connection part 121 while suppressing occurrence of an arc by securing a sufficient distance between opposite ends of the first fuse part 424.

By way of summation and review, as described above, since the secondary battery according to one or more embodiments includes a fuse part having a first fuse hole and a second fuse hole spaced apart from each other, an arc may be suppressed by securing a sufficient distance between opposite ends of the fuse part. Accordingly, the secondary battery according to one or more embodiments may have improved safety by increasing the reliability of the fuse part functioning as a fuse.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
   an electrode assembly including a first electrode plate, a second electrode plate, and a separator interposed between the first electrode plate and the second electrode plate;
   a case accommodating the electrode assembly; and
   a first current collector plate electrically connected to the first electrode plate and having a first fuse part at a first side of the electrode assembly, wherein the first fuse part includes:

first and third fuse holes adjacent the corner, and second and fourth fuse holes spaced apart from the first and third fuse holes, and farther from the corner than the first and third fuse holes.

2. The secondary battery as claimed in claim 1, wherein the first current collector plate includes:

a first connection part connected to the first electrode plate at the first side of the electrode assembly; and a first extension part bent and extended from the first connection part and extending between to be located at an upper portion of the electrode assembly and the case, wherein a corner is formed at a portion where the first connection part and the first extension part meet.

3. The secondary battery as claimed in claim 2, wherein the first fuse part is in the first extension part.

4. The secondary battery as claimed in claim 3, wherein the first fuse hole and the second fuse hole are a same size.

5. The secondary battery as claimed in claim 3, wherein the first fuse hole and the second fuse hole each have a width in a range of about 0.5 to about 2.0 mm.

6. The secondary battery as claimed in claim 3, wherein a distance between the first fuse hole and the second fuse hole is two to four times of a width of the first fuse hole or the second fuse hole.

7. The secondary battery as claimed in claim 3, further comprising a first terminal hole in the first current collector plate to be engaged with a first electrode terminal, the second fuse hole being between the first fuse hole and the first terminal hole.

8. The secondary battery as claimed in claim 3, wherein:

the first and third fuse holes are equally spaced apart from the corner, and the second and fourth fuse holes are equally spaced apart from the first and third fuse holes.

9. The secondary battery as claimed in claim 3, further comprising a first terminal hole in the first current collector plate to be engaged with a first electrode terminal, the second and fourth fuse holes being between each of the first and third fuse holes and the first terminal hole.

10. The secondary battery as claimed in claim 2, wherein the first fuse part is in the first connection part.

11. The secondary battery as claimed in claim 10, wherein the first fuse hole and the second fuse hole are a same size.

12. The secondary battery as claimed in claim 10, wherein the first fuse hole and the second fuse hole each have a width in a range of about 0.5 to about 2.0 mm.

13. The secondary battery as claimed in claim 10, wherein a distance between the first fuse hole and the second fuse hole is two to four times of a width of the first fuse hole or the second fuse hole.

14. The secondary battery as claimed in claim 10, wherein:

the first and third fuse holes are equally spaced apart from the corner, and the second and fourth fuse holes are equally spaced apart from the first and third fuse holes.

* * * * *